United States Patent [19]

Evequoz

[11] Patent Number: 4,708,353

[45] Date of Patent: Nov. 24, 1987

[54] SKI-SLEDGE

[76] Inventor: Jean-Yves Evequoz, Av. Vinet 12, 1004 Lausanne, Switzerland

[21] Appl. No.: 801,841

[22] Filed: Nov. 26, 1985

[30] Foreign Application Priority Data

Dec. 3, 1984 [CH] Switzerland .......................... 5736/84

[51] Int. Cl.⁴ .............................................. B62B 13/02
[52] U.S. Cl. .................................... 280/16; 280/12 H; 280/12 KL; 267/42
[58] Field of Search ...................... 280/23, 12 F, 12 H, 280/16, 25, 26, 12 K, 12 KC, 21 R; 267/158, 160, 42

[56] References Cited

U.S. PATENT DOCUMENTS

| 535,851 | 3/1895 | Olson | 280/26 |
| 4,428,437 | 1/1984 | Steinberg | 267/158 |

FOREIGN PATENT DOCUMENTS

| 2707434 | 3/1978 | Fed. Rep. of Germany | 280/16 |
| 361891 | 10/1906 | France | 267/42 |
| 1511692 | 5/1978 | United Kingdom | 267/42 |

Primary Examiner—David M. Mitchell
Attorney, Agent, or Firm—Tarolli, Sundheim & Covell

[57] ABSTRACT

A ski-sledge is disclosed which comprises steering column, a front ski, two guide rods and two rear skis. The front ski is pivoted on the steering column, while both guide rods are connected at their front ends in common with the steering column and at their rear ends to a rear ski coordinated therewith. The connection between rear skis and guide rods is accomplished by first pivot joints comprising annular spring assembly, which are deformable radially and peripherally, but substantially rigid in directions transverse to the annulus plane. Second pivot joints comprising similar annular spring assemblies serve for connection between guide rods and the steering column. However, the latter spring assemblies are nearly rigid in radial direction. Due to these features the ski-sledge is easier and more precisely to ride and generally better to handle.

15 Claims, 5 Drawing Figures

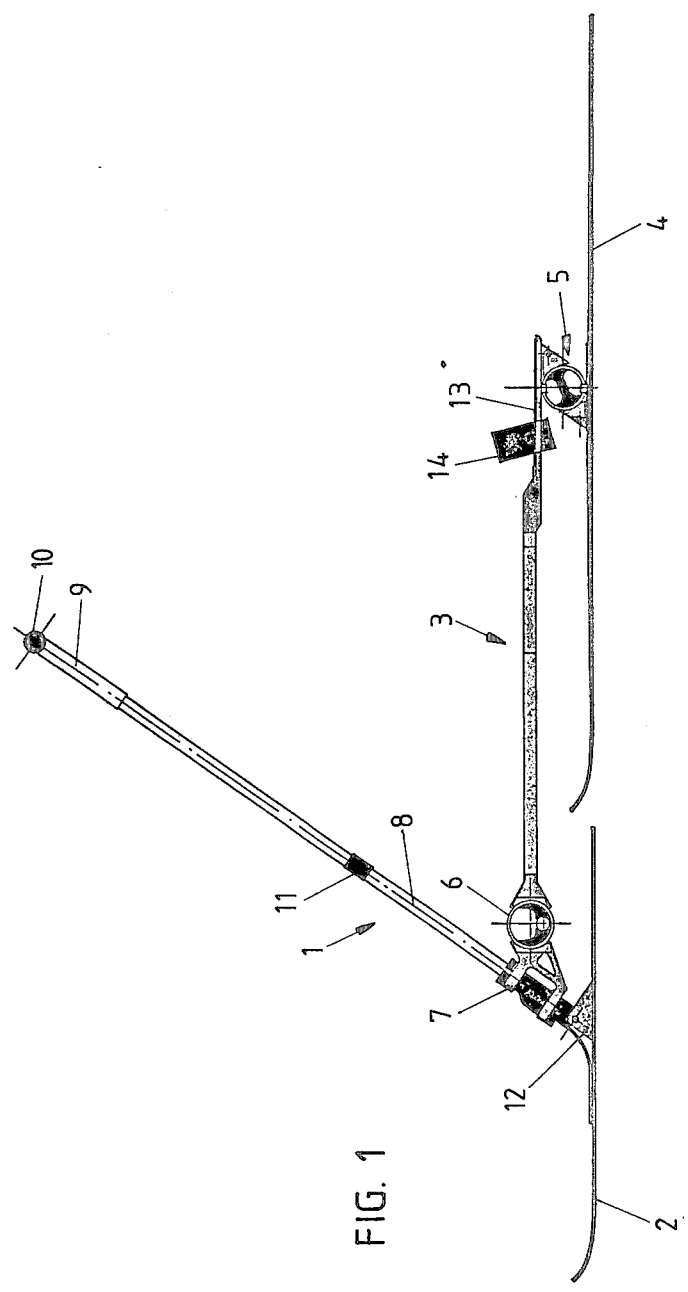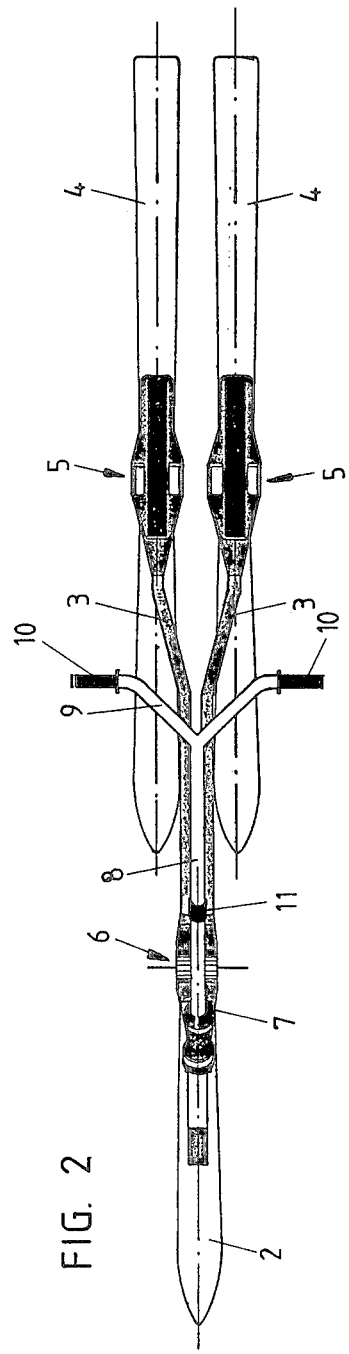
FIG. 1
FIG. 2

SKI-SLEDGE

BACKGROUND OF THE INVENTION

The present invention refers to a ski-sledge including two rear skis and one front ski, which is arranged pivotably around a steering axis and which is connected with steering means, and further including two guide rods, each of which is connected in the region of one of its ends with one of said rear skis through first pivot means, both said guide rods being connected in the region of their other ends jointly with said steering means through second pivot means.

The object of the present invention is to improve the ski-sledge of the above-mentioned kind in such a manner as to make it easier and more precisely to ride and thus generally to improve its handling qualities.

SUMMARY OF THE INVENTION

The object of the invention mentioned above is achieved by realizing the following features:

(a) each of said guide rods being elastically pivotable in relation to said steering means in a plane, which is substantially parallel to said steering axis;

(b) each of said rear skis being elastically pivotable in relation to the associated guide rod in a plane which is substantially parallel to said steering axis;

(c) said guide rods and rear skis being arranged substantially rigid in relation to each other in a plane which is substantially parallel to the driving ground plane of the sledge.

These features of the invention make sure that the whole arrangement comprising the steering means with the front ski, the guide rods and the rear skis has an elastic behavior in the direction of the load acting on the sledge, i.e. in a generally vertical direction. Therefore, the sledge can adapt itself to inequalities of the ground in an optimal manner. This is facilitated by the fact that the front ski can be connected elastically pivotable with the steering means in a manner known per se. On the other side, the foregoing features make sure that the rear skis always hold their position in the longitudinal direction of the sledge and that their sliding surfaces are always parallel to each other. Keeping sliding surfaces of the rear skis parallel to each other is most important when the sledge drives along curves in a laterally inclined position with the guide rods being in different vertical swing or pivot positions.

In a maintenance-free pivot construction of low weight, which can be produced with extremely low cost and which, moreover, fulfills the actual demands with regard to elastical deformability on one side and with regard to rigidity on the other side, annular spring means or elements are highly preferrable. For the first pivot means such annular spring means advantageously can be constructed so as to be elastically deformable in radial direction and in peripheral direction with respect to the annulus axis. For the second pivot means, however, annular spring means substantially rigid in radial direction are advantageous. Preferably such spring means comprises a closed annular spring member which is elastically deformable, as well as two connection members which are arranged within said spring member and connected therewith, and a support member inserted between these connection members. Advantageously the latter are positioned in diametrically opposite to each other.

Further features and details of preferred embodiments of the invention can be gathered from the description that follows and the drawings attached hereto.

BRIEF DESCRIPTION OF THE DRAWINGS

The drawings attached hereto illustrate one preferred embodiment of a ski-sledge according to the invention. The drawings comprise different views of the embodiment as follows:

FIG. 1 is a schematic side view of the complete sledge;

FIG. 2 is a schematic plan view of the complete sledge;

DESCRIPTION OF THE PREFERRED EMBODIMENT

Figure 3:
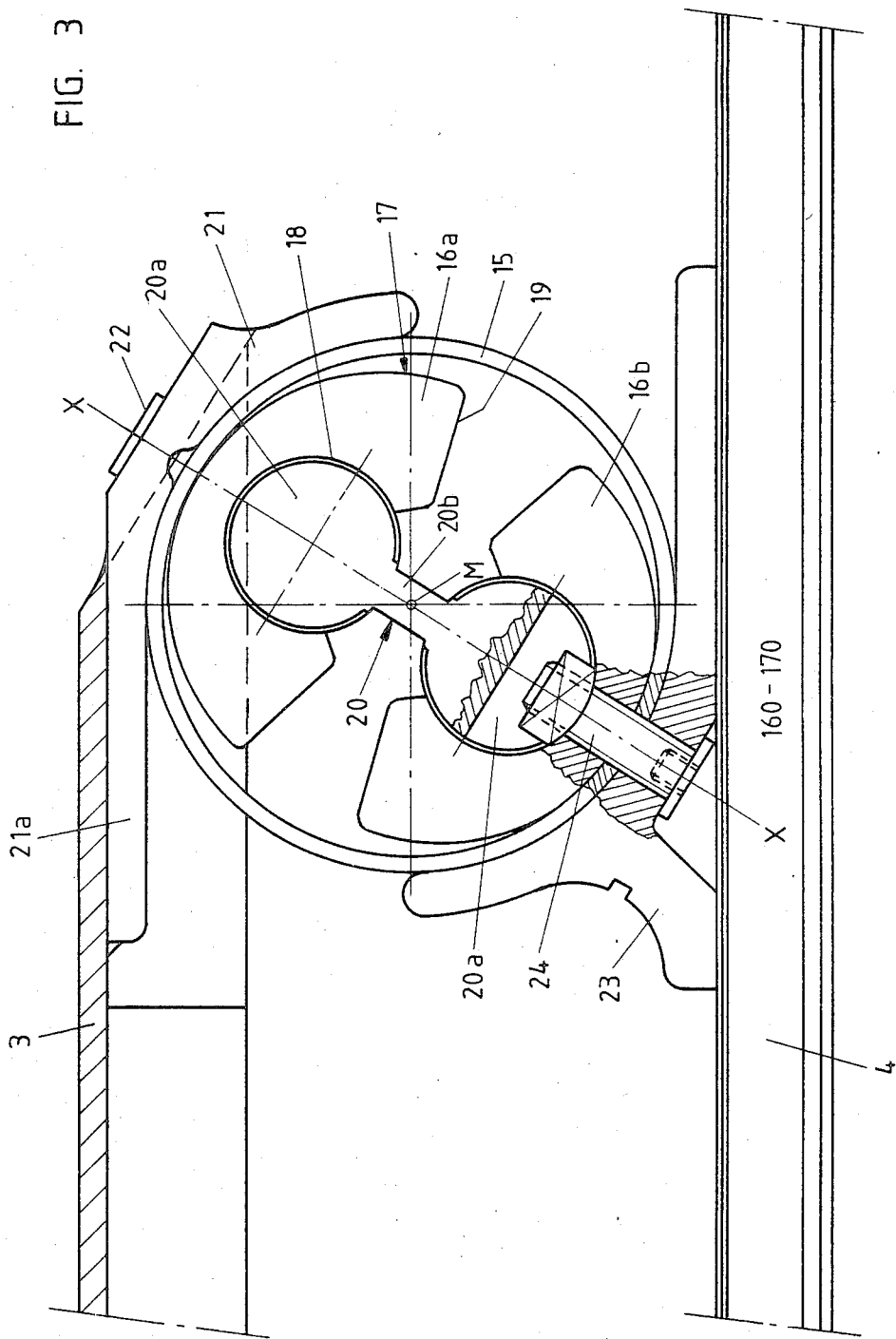
FIG. 3 is a detailed, part-sectional side view of pivot means between a guide rod and a rear ski.

As shown in FIGS. 1 and 2 the ski-sledge substantially consists of steering means 1 carrying a front ski 2, two guide rods 3 extending generally horizontal, and two rear skis 4 connected with the guide rods 3.

The connection between the guide rods 3 and the rear skis 4 is accomplished by means of first pivot means 5, while the guide rods 3 at their other ends are connected through second pivot means 6 with a bearing member 7. The latter surrounds a steering column 8 of the steering means 1 in such manner that column 8 is connected rotatably with the bearing member 7, but secured against axial displacement with regard to the bearing member. A handlebar 9 is fastened on the upper end of steering column 8, the ends of the handlebar each being provided with a handle 10. Preferrably the steering column 8 is construed so as to be dismountable in order to facilitate transport of the sledge. A sleeve 11 can be provided for assembling the column parts.

At the lower end of steering column 8 the front ski is pivotably secured by means of a connection element 12 in a manner known per se. An elastic element not illustrated in the drawings can be provided, also in a manner known per se, which element tends to hold the front ski 2 in a rest position substantially in parallel to the guide rods. In the region of their rear ends guide rods 3 are provided each with a plate 13 for supporting shoes of the user, loops 14 there being provided for securing the shoes in position.

FIG. 3 shows the construction of the first pivot means in detail. It comprises annular or ring spring means with a closed annular spring member 15, which is elastically deformable in the plane of the ring spring member 15. For the sake of low weight, member 15 preferrably consists of fiber-reinforced plastic material, but it may also be constructed from steel or other suitable material. Within the annular spring member 15 there are two connection members 16a and 16b, the width thereof corresponding to the width of the spring member 15. These connection members can be made from aluminum. Connection members 16a and 16b are of curved cross-sectional shape with a convex curved outer surface 17 contacting a corresponding inner surface of annular spring member 15, and with a concave curved inner surface 18. The curvature of the convex outer surface 17 in a central region corresponds to the curvature of spring member 15, but increases towards both ends thereof, i.e. the curvature radius decreases accordingly.

Connection members 16a and 16b each extend over a central angle of less than 180 degrees with respect to the axis M of the annular spring means. The end faces 19 of members 16a and 16b are inclined, approximately in a radial direction with respect to axis M, and in the case of elastic deformation of the annular spring means, they form abutment surfaces, as will be explained in detail. The connection members 16a and 16b are arranged within the annular spring member 15 at least approximately diametrically opposite to each other. A support member 20, which is substantially of elongated shape and comprises two enlarged end portions 20a as well as a connecting portion 20b is inserted between these connection members. End portions 20a have curved outer surfaces shaped in accordance with the concave inner surface 18 of connection members 16a and 16b. Since the inner surfaces 18 extend over an angle of more than 180 degrees, both connection members 16a and 16b are held by support member 20 and, thereby, secured against lateral displacement along a longitudinal Axis X—X. However, pivot movement of connection members 16a and 16b in relation to support member 20 remains possible.

Spring member 15 as well as a bracket 21 is fastened to the first connection member 16a, e.g. by means of screw 22. A projecting arm 21a of bracket 21 is connected with one of the guide rods 3. The other connection member 16b is also featured to spring member 15 and further to an intermediate holding member 23, e.g. by means of a screw 24.

In the central region of the enlarged end portions of support member 20 there is an excavation for housing a screw nut. Holding member 23 is fastened to one of the rear skis 4. Longitudinal axis X—X of support member 20 is arranged under an angle in relation to the longitudinal axis of guide rod 3 and defines an angle of ca. 60 degrees therewith.

The annular spring means described above, which accomplish the connection between each of the guide rods 3 each and the rear ski coordinated therewith, allows the rear ski to pivot or swing against the associated guide rod as well as to carry out a generally vertical resilient stroke thereagainst, due to an elastic deformation of spring member 15 partly in a circumferential direction and partly in a radial direction with respect to the axis of the annular spring member. Transverse pivoting or swinging of the rear ski 4 out of the longitudinal axis of the sledge, however, is substantially impossible. A swinging movement of the rear ski 4 against the guide rod 3 within a vertical plane extending in the driving direction is possible due to the fact that the connection members 16a and 16b extend over an angle less than 180 degrees. In case of such swinging movement about the axis of the spring member, the opposing end faces 19 of the connection members 16a and 16b approximate each other, until they finally abut against each other, and, thus, limit the swinging or pivot angle. Due to the elasticity of spring member 15 the rear ski 4 and the guide rod return to their substantially parallel rest position after relief from the load.

Figure 5:
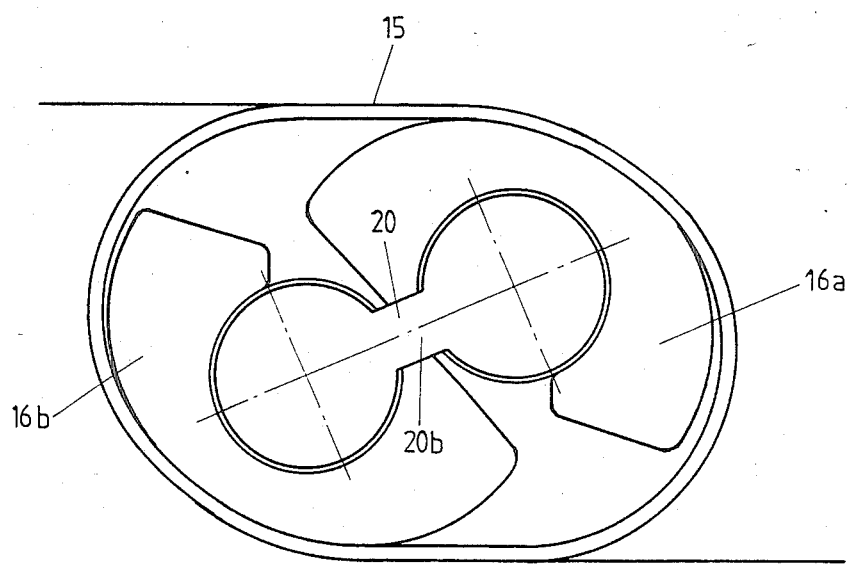
FIG. 5 is a side view of annular spring means being part of pivot means connecting a guide rod and a rear ski, the spring means being shown radially deformed under load.

FIG. 5 shows the annular spring means in an elastically deformed condition as occurring e.g. in case of a maximum vertical compression stroke of the rear ski against the guide rod. Spring member 15 then is deformed to an oval shape, and the connection members 16a and 16b are pivoted against the support member 20 in opposite directions. This vertical displacement is limited by abutment of the sloped end faces of connection members 16a and 16b against the connecting portion 20b of support member 20. A similar, but inverse condition occurs in the case of a maximum vertical stroke of the rear ski 4 directed upwards in relation to the guide rod 3. Then the other end faces of connection members 16a and 16b abut against the connecting portion 20b of support member 20, whereby the reverse stroke is limited also.

Figure 4:
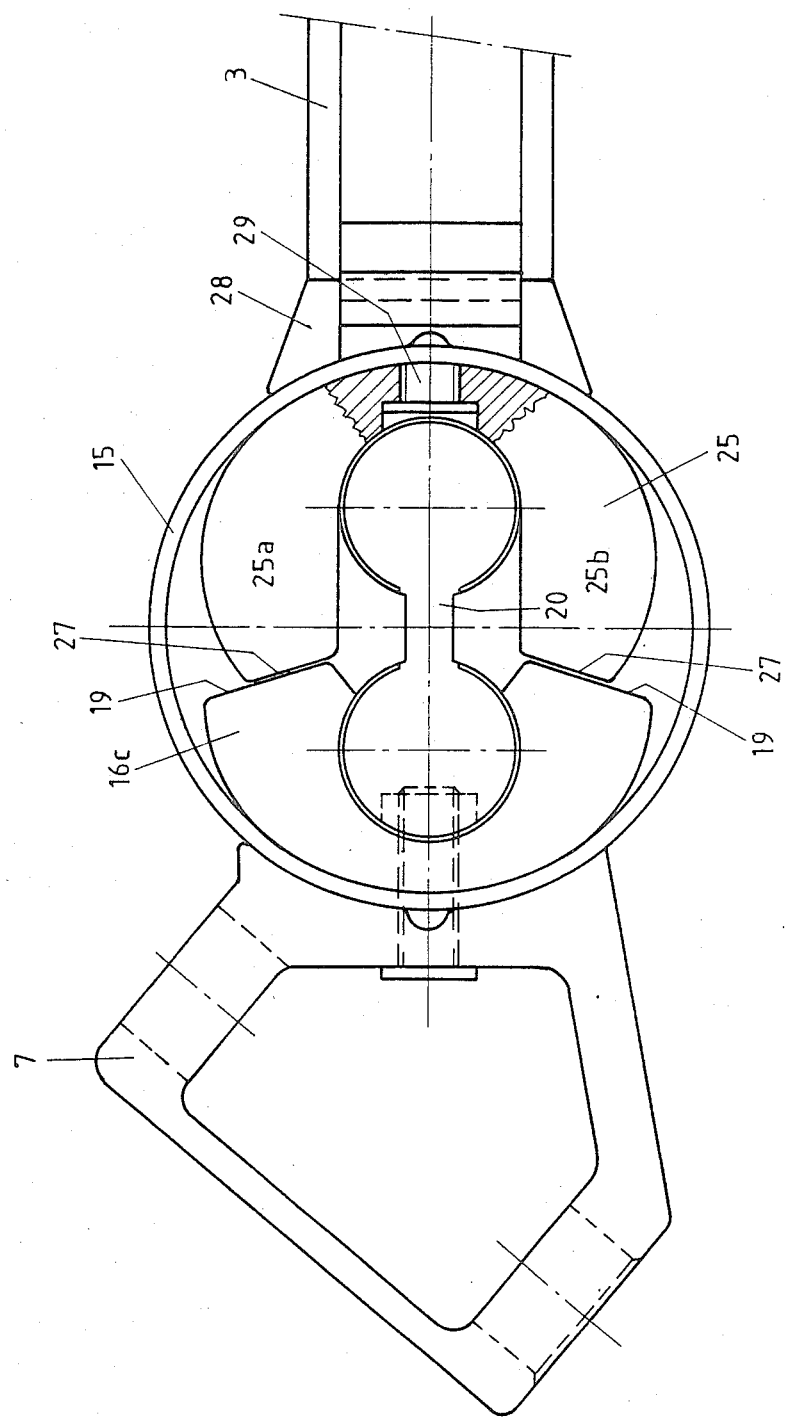
FIG. 4 is a detailed, part-sectional side view of pivot means between a guide rod and steering means.

Furthermore, FIG. 4 shows the construction of the second pivot means 6, which serve for the connection of the front end of one guide rod 3 each with the bearing member 7 of steering means 1. A closed annular spring member 15 is provided in a corresponding manner, within this spring member 15 there being first and second connection members 16c and 25 respectively. Member 16c is formed similar to connection members 16a and 16b, and it extends over an angle of less than 180 degrees as well as it is fastened by a screw 26 to spring member 15 and to bearing member 7. Furthermore, the explanations concerning shape, construction and material given above with regard to connection members 16a and 16b are valid here also. Connection member 25 has also an arcuate cross-section, but it extends over an angle of more than 180 degrees. The extension angles of connection members 16c and 25 together make the sum of 360 degrees. Therefore, the end faces 19 of member 16c are in contact with the opposing end faces 27 of member 25 in the relief condition already.

Connection member 25 is also of arcuate cross-sectional shape and has two arms 25a and 25b. The convex outer surface of member 25 has the same curvature as the inner surface of spring member 15 only within a relatively small central region, while the curvature of the outer surface of member 25 is greater in the region of arms 25a and 25b, i.e. the radius of curvature there is smaller. The concave inner surface, again, has the same curvature as connection member 16c, however, with the distinction that the curved surface extends merely over an angle of 180 degrees. Correspondingly between connection members 16c and 25 a support member 20 is inserted, the longitudinal axis of which, however, is positioned substantially horizontal, i.e. in parallel to the longitudinal axis of guide rod 3 and, accordingly, to the sliding surface of rear ski 4. The construction of the support members is similar to the one explained in connection with pivot means 5.

Connection member 25 is fastened by a screw 29 to a spring member 15 and to an intermediate holding element 28 which, on the other side, is fastened to the front end of guide rod 3.

Due to the construction of connection members 16c and 25 and the head faces thereof being in contact in the relief condition already, only limited pivoting or swinging of guide rod 3 in relation to bearing member 7 is possible, i.e. against the action of the elastically deformable spring member 15. Such deformation is possible due to the radial width of connection member 25 in the region of both arms 25a and 25b being less than the inner diameter of the annular spring member 15. Furthermore, the annular spring members of pivot means 6 due to this construction is substantially rigid in radial direction. While the connection members 25 are fastened to one of guide rods 3 each, connection members 16b are both fastened to the bearing member 7 jointly.

What is claimed is:

1. A ski-sledge including:
   two rear skis;
   a front ski pivotably arranged around a steering axis and connected with steering means;
   two guide rods, each of which is connected at one end thereof with one of said rear skis through first pivot means, and both said guide rods being connected at the other ends thereof jointly with said steering means through second pivot means;
   each of said guide rods being elastically pivotable relative to said steering means in a plane which is substantially parallel to said steering axis;
   each of said rear skis being elastically pivotable relative to the associated guide rod in a plane which is substantially parallel to said steering axis;
   said guide rods and rear skis being arranged substantially rigid in relation to each other in a plane which is substantially parallel to the driving ground plane of the ski-sledge;
   said first and second pivot means comprising first and second annular spring means, respectively;
   said first annular spring means being elastically deformable in a radial direction as well as in a circumferential direction with respect to the axis of said first annular spring means;
   said second annular spring means being substantially rigid at least in a radial direction;
   each of said first and second annular spring means comprising a closed annular spring member which is elastically deformable in the plane thereof, and first and second connection members arranged within said annular spring member and connected therewith, and a support member extending between said first and second connection members.

2. A ski-sledge as defined in claim 1 wherein said first and second connection members are arranged within the annular spring member at least approximately diametrically opposite to each other.

3. A ski-sledge as defined in claim 2 wherein each of said first and second connection members comprises an arcuate element having a convex outer surface with a curvature adapted at least partially to the curvature of said annular spring member, and a concave inner surface facing the axis of said annular spring member.

4. A ski-sledge as defined in claim 3 wherein the convex outer surface of said first and second connection members of said first annular spring means extends over a central angle of less than 180 degrees with respect to the axis of said annular spring member.

5. A ski-sledge as defined in claim 3 wherein the convex outer surface of the first connection member extends over a central angle of less 180 degrees with respect to the axis of said second annular spring means;
   the convex outer surface of the second connection member extends over a central angle of more than 180 degrees with respect to the axis of said second annular spring means; and
   the sum of both said central angles being at least approximately 360 degrees.

6. A ski-sledge as defined in claim 4 or 5 wherein said support member has at opposite ends thereof convex end faces the curvature of which corresponds at least approximately to the concave curvature of the inner surfaces of said first and second connection members.

7. A ski-sledge as defined in claim 2 wherein said first pivot means comprises two first spring means, the first and second connection members of each of the two first spring means being connected with a coordinated guide rod and a coordinated rear ski, respectively.

8. A ski-sledge as defined in claim 2 wherein said second pivot means comprises two second annular spring means, the first connection members of each of said second annular spring means being connected jointly with said steering means, and each second connection member is connected with a coordinated guide rod.

9. A ski-sledge as defined in claim 1 wherein the longitudinal axis of the support member of the first annular spring means extends at an acute angle relative to the longitudinal axis of said guide rods.

10. A ski-sledge as defined in claim 9, wherein said acute angle is between 30 and 60 degrees.

11. A ski-sledge as defined in claim 1 wherein the longitudinal axis of the support member of the second annular spring means is at least approximately parallel to the longitudinal axis of a respective guide rod or coincide therewith.

12. A ski-sledge as defined in claim 2 wherein the end faces of said first and second connection members of the first annular spring means slope and form abutment faces which, in case of a radial deformation of said annular spring member, abut against each other and, thereby, resist further deformation of said annular spring member.

13. A ski-sledge as defined in claim 1 wherein said second annular spring means comprises arcuate connection members having sloped end faces abutting on each other.

14. A ski-sledge comprising:
    a front ski and two rear skis;
    steering means connected with said front ski;
    bearing means for supporting said steering means for rotation;
    two guide rods connected to said two rear skis at one end thereof, respectively, and, at the other ends thereof, to said bearing means;
    first pivot means for connecting said guide rods to said rear skis; and
    second pivot means for connecting said guide rods to said bearing means;
    at least one of said first and second pivot means comprising two spring assemblies for connecting said guide rods to said rear skis or said bearing means, each of said spring assemblies comprising an elastically deformable closed annular spring member, two connection members located within said closed annular spring member and fixedly connected thereto, and connected, respectively, to a respective guide rod and a respective rear ski or said bearing means, and a substantially rigid support member extending between said two connection members.

15. A ski-sledge as defined in claim 14 wherein:
    each of said guide rods is elastically pivotable relative to said steering means in a plane which is substantially parallel to a steering axis;
    each of said rear skis is elastically pivotable in relation to the associated guide rod in a plane which is substantially parallel to said steering axis; and
    said guide rods and rear skis being arranged substantially rigid in relation to each other in a plane which is substantially parallel to the driving ground plane of the ski-sledge.

* * * * *